United States Patent
Ruka et al.

(10) Patent No.: US 8,043,752 B2
(45) Date of Patent: Oct. 25, 2011

(54) FUEL CELL GENERATOR WITH FUEL ELECTRODES THAT CONTROL ON-CELL FUEL REFORMATION

(75) Inventors: Roswell J. Ruka, Pittsburgh, PA (US); Richard A. Basel, Pittsburgh, PA (US); Gong Zhang, Murrysville, PA (US)

(73) Assignee: Siemens Energy, Inc., Orlando, FL (US)

( * ) Notice: Subject to any disclaimer, the term of this patent is extended or adjusted under 35 U.S.C. 154(b) by 743 days.

(21) Appl. No.: 12/115,738

(22) Filed: May 6, 2008

(65) Prior Publication Data

US 2009/0280362 A1  Nov. 12, 2009

(51) Int. Cl.
- H01M 8/06 (2006.01)
- H01M 8/24 (2006.01)
- H01M 4/82 (2006.01)
- H01M 6/00 (2006.01)
- B05D 5/12 (2006.01)

(52) U.S. Cl. ........ 429/423; 429/427; 429/452; 429/466; 29/623.1; 29/623.5; 427/115

(58) Field of Classification Search .................. 429/466, 429/423, 427, 452; 29/623.1, 623.5; 427/115
See application file for complete search history.

(56) References Cited

U.S. PATENT DOCUMENTS

| | | |
|---|---|---|
| 4,894,297 A | 1/1990 | Singh et al. |
| 4,898,792 A | 2/1990 | Singh et al. |
| 5,733,675 A | 3/1998 | Dederer et al. |
| 5,998,056 A | 12/1999 | Divisek et al. |
| 6,162,556 A | 12/2000 | Vollmar et al. |
| 6,214,485 B1 | 4/2001 | Barnett et al. |
| 6,579,331 B1 | 6/2003 | Ho |
| 6,699,609 B2 | 3/2004 | Kotani et al. |
| 6,841,279 B1 | 1/2005 | Foger et al. |
| 7,144,566 B2 | 12/2006 | Anzai et al. |
| 7,147,680 B2 | 12/2006 | Taguchi et al. |
| 7,157,172 B2 | 1/2007 | Draper et al. |
| 7,175,827 B2 | 2/2007 | Anzai et al. |
| 7,235,321 B2 * | 6/2007 | Sarkar et al. .................. 429/423 |
| 7,659,025 B2 * | 2/2010 | Sammes et al. ............... 429/486 |
| 7,732,076 B2 * | 6/2010 | Zheng et al. .................. 429/423 |
| 2002/0022164 A1 | 2/2002 | Keppeler |
| 2003/0054213 A1 | 3/2003 | Ishikawa |
| 2005/0014038 A1 | 1/2005 | Aoyama et al. |
| 2005/0158594 A1 | 7/2005 | Ahmed |
| 2005/0252081 A1 | 11/2005 | Kim et al. |
| 2006/0040153 A1 | 2/2006 | Tokoi et al. |
| 2007/0071662 A1 | 3/2007 | Kawakita et al. |
| 2007/0087235 A1 | 4/2007 | Kim et al. |
| 2007/0160886 A1 | 7/2007 | Digiuseppe |
| 2007/0298299 A1 | 12/2007 | Izawa et al. |

* cited by examiner

Primary Examiner — Patrick Ryan
Assistant Examiner — Julian Anthony (57) ABSTRACT

A fuel cell for a fuel cell generator including a housing including a gas flow path for receiving a fuel from a fuel source and directing the fuel across the fuel cell. The fuel cell includes an elongate member including opposing first and second ends and defining an interior cathode portion and an exterior anode portion. The interior cathode portion includes an electrode in contact with an oxidant flow path. The exterior anode portion includes an electrode in contact with the fuel in the gas flow path. The anode portion includes a catalyst material for effecting fuel reformation along the fuel cell between the opposing ends. A fuel reformation control layer is applied over the catalyst material for reducing a rate of fuel reformation on the fuel cell. The control layer effects a variable reformation rate along the length of the fuel cell.

20 Claims, 4 Drawing Sheets

FUEL CELL GENERATOR WITH FUEL ELECTRODES THAT CONTROL ON-CELL FUEL REFORMATION

This invention was made with U.S. Government support under Contract Number DE-FC26-05NT42613 awarded by the U.S. Department of Energy. The U.S. Government has certain rights to this invention.

FIELD OF THE INVENTION

The present invention relates generally to fuel cell generators, and more particularly, to fuel cell generators having fuel electrodes that facilitate an on-cell controlled reformation of fuels.

BACKGROUND OF THE INVENTION

A fuel cell generator converts chemical energy directly into electrical energy. Most fuel cell generators comprise a cathode or air electrode and an anode or fuel electrode separated by an electrolyte. At the cathode, oxygen is ionized and the oxide ions migrate through the electrolyte to the anode. At the anode, hydrogen or hydrocarbons react with the oxide ions to form water and release electrons. The released electrons then travel from the anode out of the fuel cell generator through a load and are returned to the cathode, thereby completing the circuit and providing an amount of direct electrical current. It is well known in the art that ion quantities can vary and additional or other constituents can be used.

Fuel cell generators typically comprise a plurality of electrically interconnected fuel cells. The fuel cell generators usually use a hydrogen-bearing and/or carbon-bearing fuel (i.e. natural gas, methane, carbon monoxide) at the anode, and an oxidant (i.e. air, oxygen) at the cathode. A schematic arrangement of one such fuel cell generator, which uses solid oxide fuel cells (SOFC), is described in U.S. Pat. No. 4,395,468.

Because fuel cell generators are efficient, use plentiful and renewable fuels, do not require direct combustion, and produce low undesirable emissions, they are a very attractive energy conversion device. However, although the basic electrochemical processes and schematic arrangement of fuel cell generators are well understood, engineering solutions necessary to lower fabrication costs and make such generators an economical alternative to fossil fuel and other power generation systems remain elusive.

One technical problem with conventional fuel cell generators involves a reformation of the hydrocarbon fuels, which are typically reformed to produce CO, $H_2$, $CO_2$ and $H_2O$ as gaseous reformation products. The gaseous reformation products, which are also called reformate, form a suitable fuel gas for the operation of the fuel cell generator to produce electricity.

The process of reformation may be carried out externally or internally (i.e. inside or outside the high-temperature fuel cell module). External reformers, which are known for performing the external reformation process, can be expensive and also take up valuable space in and around the fuel cell generator. One type of fuel reforming SOFC uses pre-reformers and separate stack reformer boards (SRBs) to reform the fuel before reaching the anode. However, the SRBs are expensive and thus it would be preferable to avoid use of SRBs in generators by providing a less expensive alternative.

Prior art arrangements for developing SOFCs having internal fuel reformers may result in excessive cooling of the closed end of the fuel cell due to the fuel reformation, which may decrease performance of the closed end of the fuel cell. Further, excessive cooling of the closed end of the fuel cell may result in high levels of thermal stress on the fuel cell bundles, which may cause damage to the generator.

There is a continuing need for a fuel cell generator construction that addresses thermal stress factors associated with operation of fuel cell bundles, while providing sufficient fuel reformation for the production of electrical energy.

SUMMARY OF THE INVENTION

In accordance with a first aspect of the present invention, a fuel cell is provided for a fuel cell generator comprising a housing including a gas flow path for receiving a fuel from a fuel source and directing the fuel across the fuel cell. The fuel cell comprises an elongate member_including opposing first and second ends and defining an interior cathode portion and an exterior anode portion. The interior cathode portion comprises an electrode in contact with an oxidant flow path. The exterior anode portion comprises an electrode in contact with the fuel in the gas flow path. The anode portion comprises a catalyst material for effecting fuel reformation along the fuel cell between the opposing ends. A fuel reformation control layer is applied over the catalyst material for reducing a rate of fuel reformation on the fuel cell. The control layer effects a variable reformation rate along the length of the fuel cell.

In accordance with a second aspect of the present invention, a fuel cell bundle is provided for a fuel cell generator module comprising a housing including a gas flow path for receiving a fuel from a fuel source and directing the fuel across the fuel cell bundle. The fuel cell bundle comprises a plurality of elongate members. Each of the members includes opposing first and second ends and defines an interior cathode portion and an exterior anode portion. The interior cathode portion comprises an electrode in contact with an oxidant flow path and the exterior anode portion comprises an electrode in contact with the fuel in the gas flow path. An interconnection between adjacent fuel cells forms an electrical connection between the cathode portion of one fuel cell and the anode portion of an adjacent fuel cell. The anode portion of each fuel cell comprises a catalyst material for effecting fuel reformation along the fuel cell between the opposing ends. A fuel reformation control layer is applied over the fuel cells and interconnections forming the fuel cell bundle. The control layer reduces a rate fuel reformation on the fuel cells to effect a variable reformation rate along the length of the fuel cells.

In accordance with a third aspect of the present invention, a method is provided of producing a fuel cell bundle for a fuel cell generator module comprising a housing including a gas flow path for receiving a fuel from a fuel source and directing the fuel across the fuel cell bundle. The method of producing a fuel cell module comprises the steps of providing a plurality of elongate members defining fuel cells, providing an interconnection between adjacent fuel cells forming an electrical connection between the cathode portion of one fuel cell and the anode portion of an adjacent fuel cell, and applying a fuel reformation control layer over the fuel cells and interconnections forming the fuel cell bundle. Each of the members includes opposing first and second ends and defines an interior cathode portion and an exterior anode portion. The interior cathode portion comprises an electrode in contact with an oxidant flow path and the exterior anode portion comprises an electrode in contact with the fuel in the gas flow path. The anode portion of each fuel cell comprises a catalyst material for effecting fuel reformation along the fuel cell between the opposing ends. The control layer retards fuel reformation on the fuel cells to effect a variable reformation rate along the length of the fuel cells.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
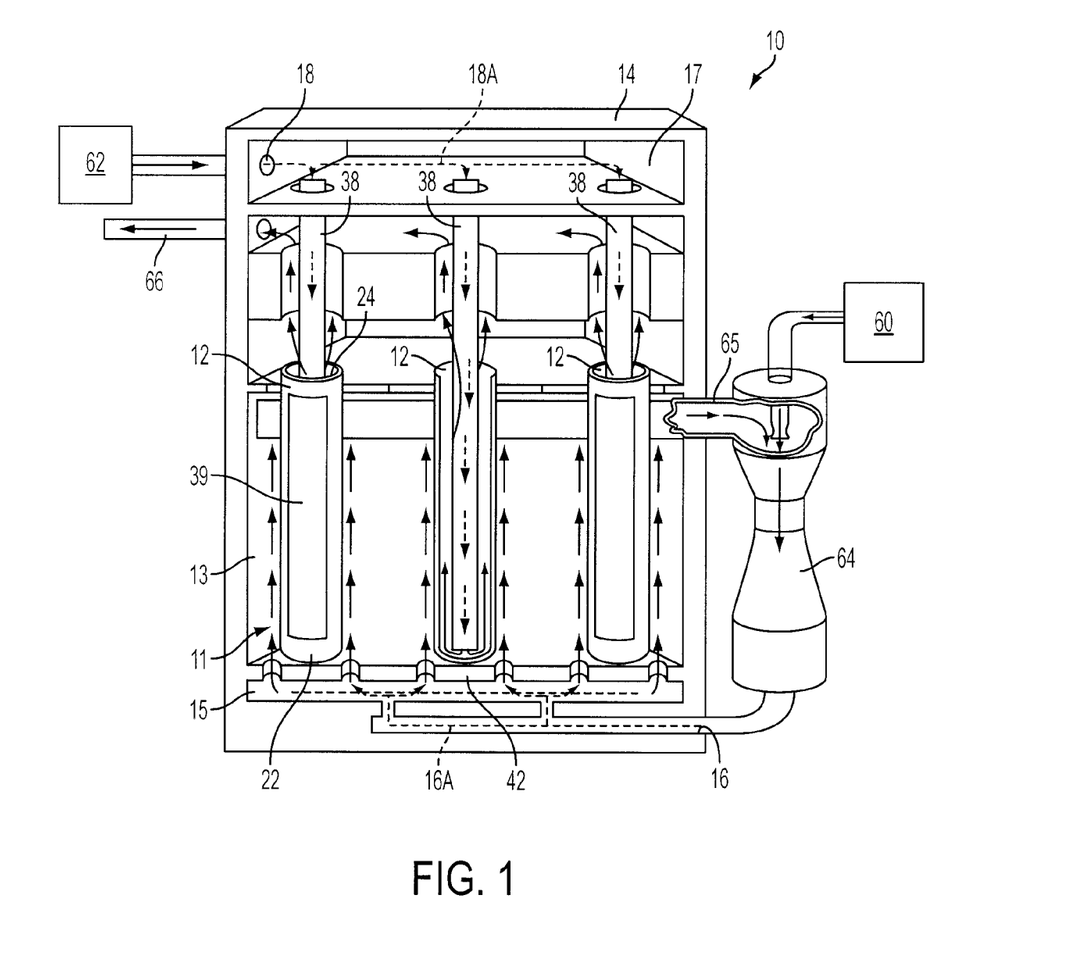
FIG. 1 is a diagrammatic sectional view of a fuel cell module according to an embodiment of the invention.

Referring to FIG. 1, a fuel cell module 10 comprising a fuel cell bundle 11 for use in a fuel cell generator is shown. In this embodiment, the fuel cell bundle 11 includes a plurality of fuel cells 12 electrically interconnected in series, such as, for example, solid oxide fuel cells (SOFC). It is understood that the fuel cell bundle 11 may have any number of fuel cells 12 and may be otherwise configured depending on the particular application of the fuel cell generator. Further, the fuel cell module 10 may comprise any number of fuel cell bundles 11 as desired.

The fuel cell bundle 11 is disposed in a housing 14 including a fuel inlet 16 in communication with a gas flow path 16A defined in the housing 14, and an oxidant inlet 18 in communication with an oxidant flow path 18A defined in the housing 14. The gas flow path 16A delivers a fuel, such as, for example, hydrogen gas, methane, carbon monoxide, or natural gas, to a fuel chamber 13 in the housing 14 via a fuel inlet chamber 15. The oxidant flow path 18A delivers an oxidant, such as, for example, oxygen or air, to the fuel cell bundle 11 via an oxidant inlet chamber 17.

Figure 2:
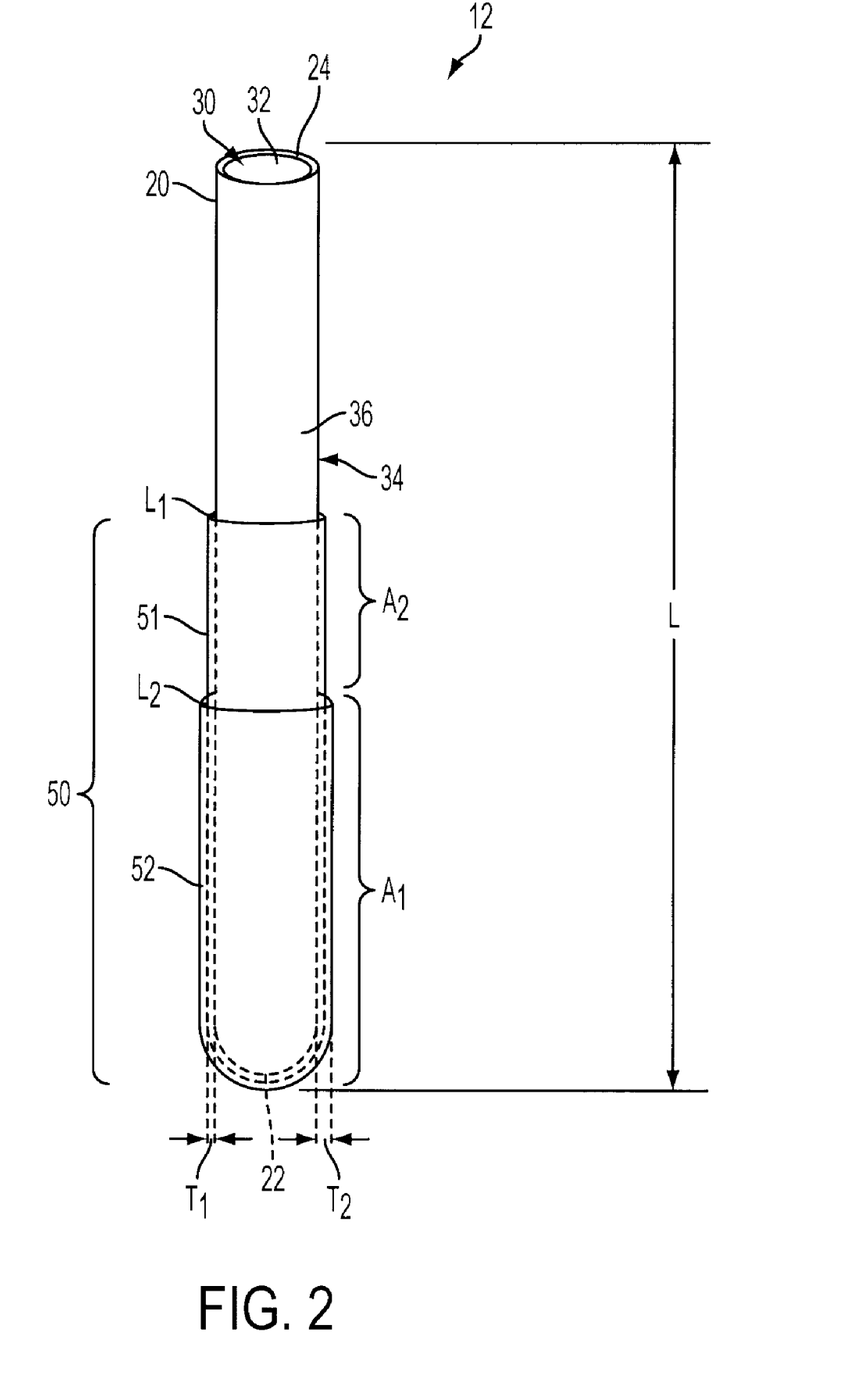
FIG. 2 is an enlarged perspective view of one of the tubular fuel cells included in the fuel cell module illustrated in FIG. 1 showing first and second fuel reformation control layers thereon.

FIG. 2 illustrates a single fuel cell 12 to be employed in the fuel cell module 10 shown in FIG. 1. The fuel cell 12 comprises a porous elongated member 20, such as, for example, a tubular member as shown in FIGS. 1 and 2, having a first closed end 22 and an opposing second open end 24. It is understood that other types of fuel cells may be used, such as, for example, an open ended fuel cell or a flat fuel cell as disclosed in U.S. Patent Application Publication US 2007/0160886A1, the entire disclosure of which is incorporated by reference herein. In an exemplary embodiment, the member 20 comprises a porous air electrode approximately one to two millimeters thick, although it is understood that members having other configurations could be used as desired. It is also understood that other portions of the fuel cell 12 may provide the structural support provided by the member 20, such as a cathode portion 32 described below, in which case the cathode portion 32 would comprise the member 20, and a separate member to provide mechanical support for the fuel cell 12 would not be necessary.

The fuel cell 12 comprises an interior portion 30 defining the cathode portion 32. The cathode portion 32 comprises an oxidant electrode that is in gaseous communication with the oxidant inlet chamber 17 through an oxidant feed tube 38 (see FIG. 1), and defines a portion of the oxidant flow path 18A extending inside the member 20. The cathode portion 32 may be approximately 0.05 millimeter to 2.5 millimeter thick, and can be deposited onto the member 20 using any known technique. The oxidant electrode may comprise, for example, doped and undoped oxides or mixtures of oxides, such as $LaMnO_3$, $CaMnO_3$, $LaNiO_3$, $LaCoO_3$, $LaCrO_3$, various noble metals, and other electronically or mixed conducting mixed oxides i.e. rare earth oxides chemically combined with oxides of cobalt, nickel, copper, iron, chromium and manganese, and combinations of such oxides. The preferred cathode is doped $LaMnO_3$, and preferred dopants include strontium, calcium, cobalt, nickel, and iron.

The fuel cell 12 also comprises an exterior portion 34 defining a porous anode portion 36 that may be about 100 micrometers thick. The anode portion 36 comprises a fuel electrode that is in fluid communication with a portion of the gas flow path 16A extending through the fuel chamber 13 (see FIG. 1). The fuel electrode may comprise a catalyst material, such as, for example, nickel, imbedded in a surrounding skeleton. The skeleton may comprise, for example, yttria doped zirconia (YSZ) or scandia-doped zirconia (ScSZ). As shown in FIG. 1, a fuel distribution board 42 may be disposed in the gas flow path 16A between the fuel inlet chamber 15 and the fuel chamber 13 to deliver the fuel to the fuel chamber 13 for passage over the fuel electrode.

A layer of gas-tight solid electrolyte (not shown), generally comprised of, for example, ScSZ, is disposed between the cathode portion 32 and the anode portion 36. The electrolyte may be about 1 micrometer to 100 micrometers thick, and may be deposited, for example, by well known high temperature vapor deposition techniques or plasma spray techniques. In an exemplary embodiment, a selected radial segment is masked during electrolyte deposition, and a layer of an electrical interconnect material 39 (see FIG. 1) is deposited on this segment to form an electrical connection between the cathode portion 32 of one fuel cell 12 and the anode portion 36 of an adjacent fuel cell 12. The preferred electrical interconnect material 39 is lanthanum chromite doped with calcium, strontium or magnesium, but may be any suitable material. Optionally, the electrical connection may be enhanced by a porous metal felt or foam (not shown) made, for example, of nickel, as disclosed in U.S. Pat. No. 4,894,297, the entire disclosure of which is incorporated herein by reference. The felt may extend axially between the fuel cells 12, and may be bonded to each fuel cell 12 by pressure contact which causes sinter bonding during operation. It is noted that the electrical interconnect material 39 is not shown in FIG. 2.

As seen in FIG. 2, a fuel reformation control layer 50 is located on the fuel cell 12. The control layer 50 comprises a coating material deposited on at least a portion of the fuel electrode for controlling i.e., limiting, contact and reaction of the fuel with the catalyst material in the fuel electrode to reduce the rate of fuel reformation on the fuel cell 12. In a preferred embodiment, the fuel reformation control layer 50 comprises an applied water solution of metal acetates. The type of solution used may vary based upon the particular application, but preferably comprises at least one of the respective acetates, lactates, or nitrates of Cr, Al, Mg, Y, Sc, Zr, and most preferably includes the acetates of Mg, Y, and Zr. It is noted that a small amount of acetic acid and/or lactic acid may be included in the solution to improve solubility. The solution is applied and is allowed to dry and heated, wherein the applied solution is converted to corresponding oxides of the Cr, Al, Mg, Y, Sc, and/or Zr to form the control layer 50. It is understood that the solution may be applied in any manner and/or using multiple independent procedures, such as by, for example, a brushing, a wash coating, or a dipping as is described further below. It is noted that the application of a solution including Mg acetate is preferred, as when converted to the corresponding Mg oxide by heating, the resulting control layer 50 prevents carbon deposition on the fuel electrode.

In the preferred embodiment, the control layer 50 is applied to provide a variable exposure of the catalyst material to the fuel over at least a portion of the length of the fuel cell 12 and comprises a lesser exposure of the catalyst material adjacent to the closed end 22 of the fuel cell 12 than adjacent to the open end 24. For example, as illustrated in FIG. 2, the control layer 50 may extend from the closed end 22 of the fuel cell 22 to an intermediate location between the closed end 22 and the open end 24, as identified by location $L_1$, to provide a limited exposure of the catalyst material along a portion of the fuel cell 12 from the closed end 22 to location $L_1$, as compared to a fully exposed area between location $L_1$ and the open end 24.

A further configuration for providing a controlled variation in the exposure of the catalyst material to the fuel may be effected by varying a characteristic of the control layer 50. For example, the control layer 50 may be defined along at least a first area $A_1$ and a second area $A_2$ located longitudinally along the length of the fuel cell 12. The first area $A_1$ is defined adjacent to the closed end 22, extending between the closed end 22 and a location $L_2$ on the fuel cell 12, and the second area $A_2$ is defined between the first area $A_1$ and the open end 24, i.e., extending between location $L_2$ and location $L_1$. One or more characteristics of the control layer 50 may be selectively controlled such that the portion of the control layer 50 extending along the first area $A_1$ of the fuel cell 12 effects a lesser exposure of the catalyst material to the fuel than the portion of the control layer 50 extending along the second area $A_2$. It should be understood that additional areas, or increments of areas, may be defined along the control layer 50 where each area provides a variation in the exposure of the catalyst material to the fuel, and that the control layer 50 may be provided with a progressively or smoothly varying characteristic for controlling exposure of the catalyst material to the fuel.

The variable characteristic of the control layer 50 may comprise a variation in the thickness or a variation in the density or concentration of the applied material. Alternatively, the chemical composition of the material applied as the control layer 50 may be varied to effect the variable exposure of the catalyst material to the fuel. It should also be understood that a combination of these characteristics may be implemented to obtain a particular desired variation in the operable characteristics of the control layer 50.

In a preferred embodiment, the control layer 50 may extend along a portion of the fuel cell 12 up to about one-half of the total length L of the fuel cell 12. In a most preferred embodiment, the control layer 50 extends along about one-third of the length L of the fuel cell 12. The remaining portion of the fuel cell 12, i.e., between location $L_1$ and the open end 24 of the fuel cell 12, does not include the control layer 50. It should be understood that, although the present description specifies a particular preferred length or extent for the control layer 50, the control layer 50 may have any desired extent along the fuel cell 12 up to substantially the entire length L of the fuel cell 12.

FIG. 2 illustrates a preferred embodiment in which the control layer 50 is provided to the fuel cell 12 through application of plural layer portions, comprising a first layer portion 51 and a second layer portion 52. The first and second layer portions 51 and 52 may be applied to the fuel cell 12 in separate or sequential application stages to form a first control layer thickness $T_1$ corresponding to application of the first layer portion 51, and a second control layer thickness $T_2$ corresponding to application of the second layer portion 52 over the first layer portion 51, as is described in greater detail below with reference to FIGS. 3 and 4. It should be noted that the particular thicknesses of $T_1$ and $T_2$, as illustrated in FIG. 2, have been shown exaggerated for illustrative purposes and that the actual thicknesses of the first and second layer portions 51, 52 are substantially thinner than shown.

Figure 3:
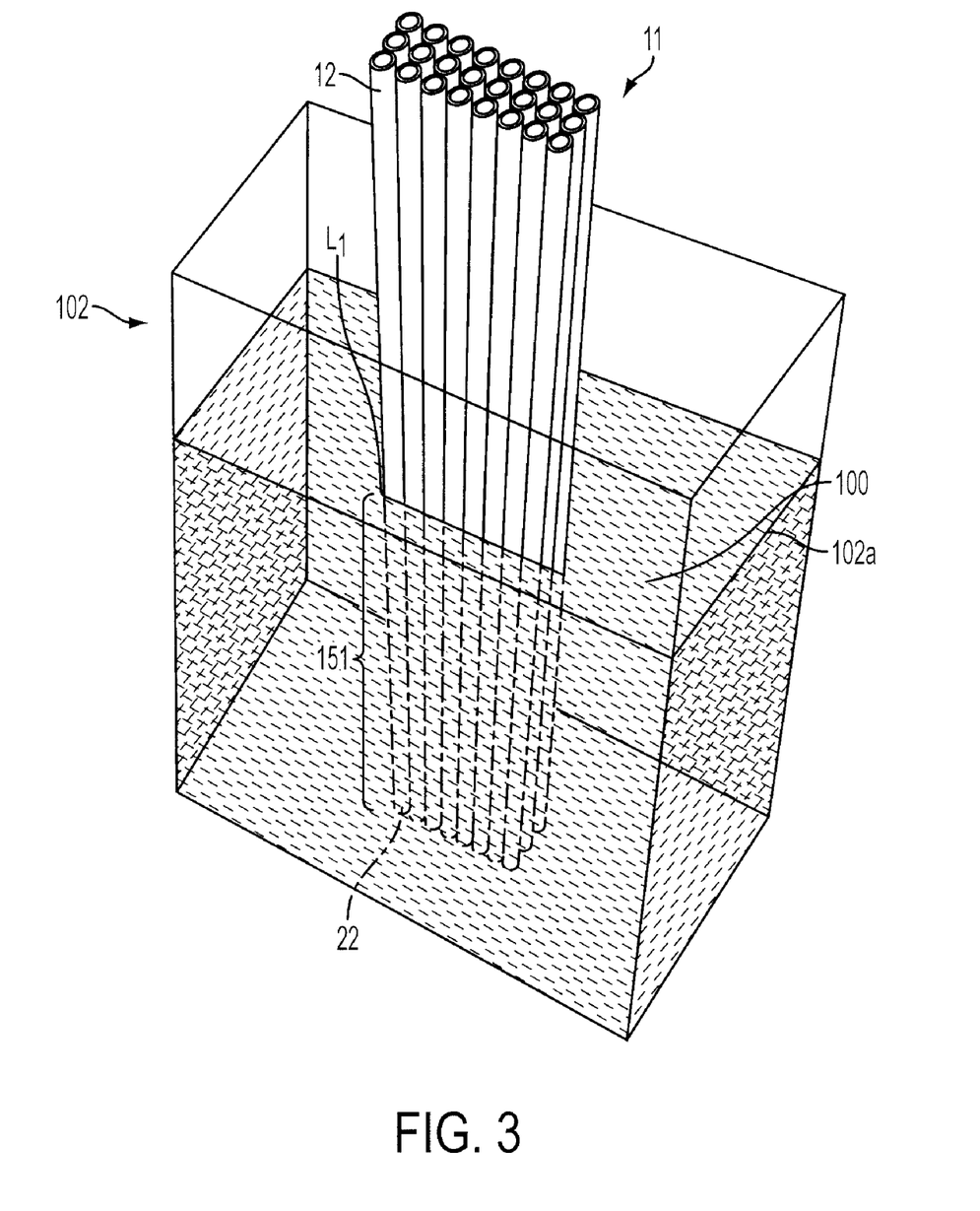
FIG. 3 is a diagrammatic representation of a procedure for applying a first fuel reformation control layer to a fuel cell bundle according to an embodiment of the invention.

Referring to FIGS. 3 and 4, the control layer 50 is preferably applied to the fuel cell bundle 11, such that the coating material forming the control layer 50 is applied over the bundle 11 comprising the fuel cells 12 and associated electrical connections (see FIG. 1). Referring in particular to FIG. 3, a first application step is illustrated for applying the coating material forming the control layer 50. The application step may comprise wash coating or dipping the fuel cell bundle 11 in a dipping basket 102 containing the coating material. The coating material preferably comprises a first water solution 100 comprising acetates and filled to a first predetermined level 102a within the dipping basket 102. In the first application step, the fuel cell bundle 11 may be inserted or dipped into the first solution 100, closed end 22 first, to immerse the fuel cells 12 from the closed end 22 up to a desired location on the fuel cell bundle 11. For example, the fuel cell bundle 11 may be immersed in the first solution 100, to apply the coating material to a first length 151 of the fuel cell bundle 11 corresponding to the length of the first layer portion 51 defined by the location $L_1$ on the fuel cells 12 (FIG. 2). The fuel cell bundle 11 is maintained in the first solution 100 for a predetermined period of time such as, for example, 10 to 60 seconds. The fuel cell bundle 11 is then removed from the first solution 100 and permitted to dry and heated such that the elements comprising the first water solution 100 are converted to their corresponding oxides to form the first layer portion 51 on the fuel cells 12 forming the fuel cell bundle 11.

Figure 4:
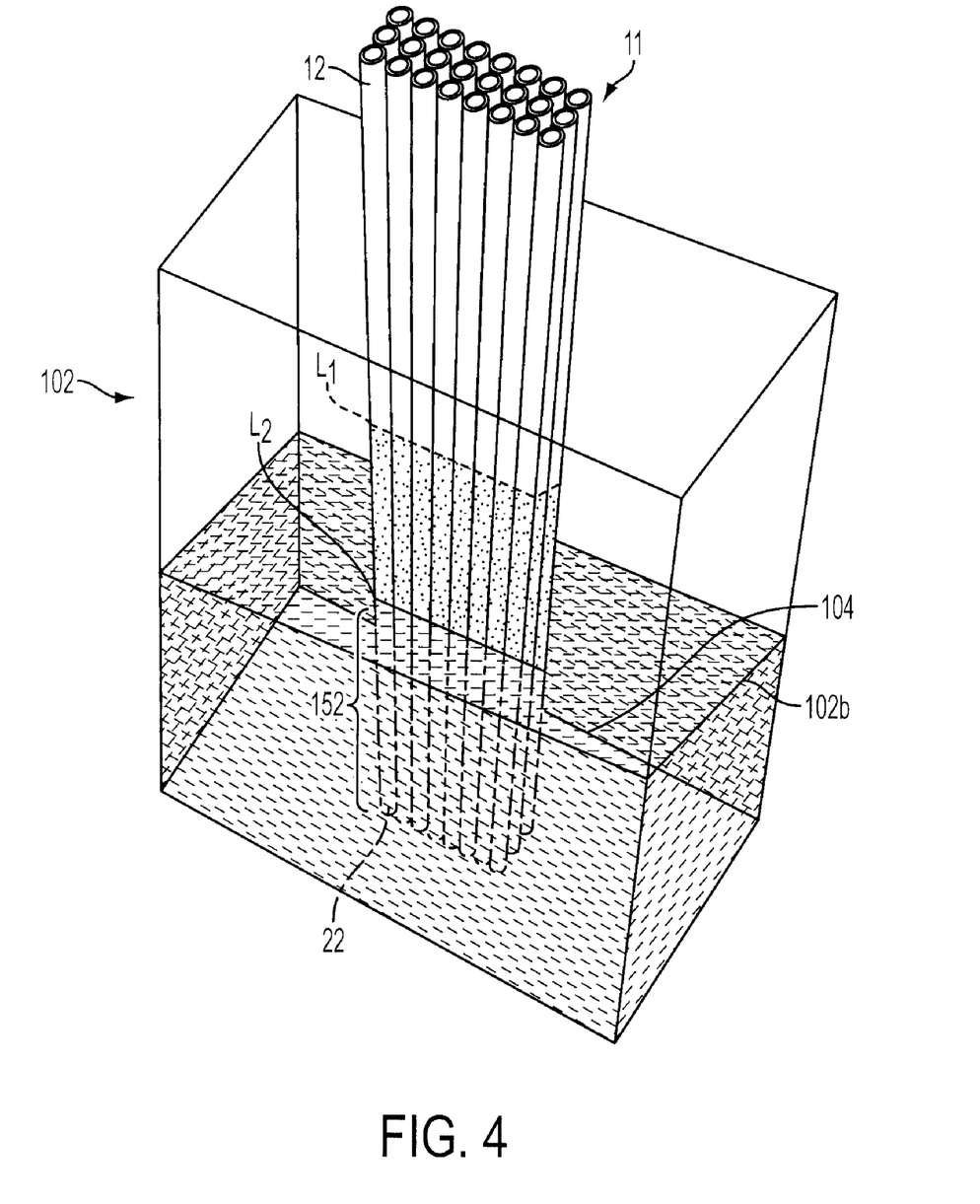
FIG. 4 is a diagrammatic representation of a procedure for applying a second fuel reformation control layer to a fuel cell bundle according to an embodiment of the invention.

Referring to FIG. 4, a second application step is illustrated for further applying the coating material forming the control layer 50, and may be performed in a manner substantially similar to the first application step. For the second application step, the dipping basket 102 is provided with a second water solution 104, which is preferably the same as the first solution 100, i.e., a water solution containing acetates. The second water solution 104 may be filled in the dipping basket 102 to a second level 102b, lower than the first level 102a. The fuel cell bundle 11 is immersed or dipped in the second solution 104, to apply the coating material to a second length 152 of the fuel cell bundle 11 corresponding to the length of the second layer portion 52 defined by the location $L_2$ on the fuel cells 12 (FIG. 2). The fuel cell bundle 11 is maintained in the second solution 104 for a predetermined period of time such as, for example, 10 to 60 seconds. The fuel cell bundle 11 is then removed from the second solution 104 and permitted to dry and heated such that the elements comprising the second water solution 104 are converted to their corresponding oxides to form the second layer portion 52 on the fuel cells 12 forming the fuel cell bundle 11.

It should be understood that the second application step of FIG. 4 could be implemented using a second solution 104 that is different from the first solution 100, and that the fuel cell bundle 11 may be immersed into the same solution 100 illustrated in FIG. 3, but to a lesser depth than the immersion of the first application step.

The first and second application steps provide a combined thickness of the coating material provided by both the first and second layer portions 51, 52 in the first area $A_1$, and defined by the second thickness $T_2$. The second area $A_2$ comprises only the coating material provided by the first application step and defined by the first thickness $T_1$. Hence, the first area $A_1$ has a greater control layer thickness $T_2$ to effect a lesser exposure of the catalyst material to the fuel than is provided by the thinner control layer thickness $T_1$ of the second area $A_2$.

While FIGS. 3 and 4 have illustrated application of the layer portions 51, 52 to the fuel cell bundle 11 using a dipping procedure, it should be understood that alternate methods of applying the control layer 50 could be used. For example, the layer portions 51, 52 of the control layer 50 could be brush coated or sprayed onto the fuel cell bundle 11. In addition, the control layer 50 could be applied in a manner to provide other configurations of the layer portions 51, 52 for effecting different degrees of exposure of the catalyst material to the fuel passing over the fuel cell bundle 11. For example, layer portions may be applied to provide a pattern wherein denser or thicker areas, or areas having different solution compositions, are applied adjacent to the closed ends 22 of the fuel cells 12. Additionally, while the first layer portion 51 has been described as being applied to the fuel cell bundle 11 before the second layer portion 52, it is understood that the second layer portion 52 could be applied before the first layer portion 51. Further, it should be noted that the electrical connections defined by the electrical interconnect material 39 between the adjacent fuel cells 12 of the fuel cell bundle 11 are immersed in the first and second solutions 100, 104 during the application, such that the coating material forming the control layer 50 on the fuel cells 12 also extends over the electrical interconnect material 39 and electrical connections between the fuel cells 12.

During operation of the fuel cell generator, fuel is introduced from a fuel source 60 (see in FIG. 1) to the fuel inlet 16 of the housing 14, and the oxidant is delivered from an oxidant source 62 (see in FIG. 1) to the oxidant inlet 18 of the housing 14. Before being introduced into the fuel inlet 16 of the housing 14, the fuel may flow through a fuel pre-reformer 64 (see FIG. 1) for pre-reforming the fuel to be delivered to the fuel cell module 10, as is known in the art. Pre-reformed fuel passing through the fuel inlet 16 enters the fuel inlet chamber 15 and flows along the gas flow path 16A through the fuel distribution board 42 to the fuel chamber 13. The fuel enters the fuel chamber 13 adjacent to the closed ends 22 of the fuel cells 12. The oxidant enters the oxidant inlet chamber 17 through the oxidant inlet 18 and is distributed to the oxidant feed tubes 38 for providing the oxidant to the cathode electrodes 34 of each of the fuel cells 12.

As the fuel enters the fuel chamber 13 adjacent to the closed ends 22 of the fuel cells 12, the fuel flows over the fuel reformation control layer 50, and a portion of the fuel penetrates the fuel reformation control layer 50 and passes into contact with the catalyst material included in the fuel electrodes. The variable characteristics of the control layer 50, such as provided by the different portions of the control layer 50 in the first and second areas $A_1$, $A_2$, effects a variable reformation rate of the fuel along the length of each of the fuel cells 12. In addition or alternatively, a variable reformation is provided between the area of the fuel cells 12 covered by the control layer 50 and the exposed area i.e., without the control layer 50, extending from the control layer 50 to the open end 24 of the fuel cell 12.

As noted above, the physical characteristics of the control layer 50 can be selected to variably limit exposure of the fuel to the catalyst material in the fuel electrodes along the portion of the fuel cells 12 including the control layer 50. For example, the particular thicknesses of the layer portions 51, 52 defining the thicknesses $T_2$, $T_1$ in the respective first and second areas $A_1$, $A_2$ of the control layer 50 may be adjusted to obtain a predetermined fuel reformation rate, or the composition and/or concentration of the control layer 50 can be selected to control the reformation rate of the fuel over the length of the fuel electrodes such as by applying a more highly concentrated solution to the first area $A_1$ than to the second area $A_2$.

As the fuel flows over the fuel electrodes, the portion that penetrates the control layer 50 contacts the catalyst material in the fuel electrodes and is reformed into a reformate suitable for an electrochemical reaction at the fuel electrode and electrolyte interface produce electric energy. Since exposure of the fuel to the catalyst material in the fuel electrodes is limited by the control layer 50, a rate of fuel reformation on the fuel electrodes is reduced or retarded. In the embodiment described herein, since the first area $A_1$ of the control layer 50 provides a lesser exposure of the fuel to the catalyst material than the exposure provided in the second area $A_2$, the fuel is reformed at a first reduced rate while flowing over the first area $A_1$ and at a second reduced rate while flowing over the second area $A_2$, wherein the first reduced rate is more retarded than the second reduced rate. The reformed fuel is then used by the fuel cell module 10 in an electrochemical reaction to produce electricity.

Anode side reaction by-product i.e. water vapor and carbon dioxide, are transferred from the fuel cell module 10 with any unused fuel through an anode gas fuel recycle 65 (see FIG. 1). Fuel and other reaction by-product not used in the reaction may be used for heat transfer purposes and/or reintroduced into the fuel pre-reformer 64 for introduction back into the fuel cell module 10, as is known in the art. Oxidant not used in the reaction, in addition to any cathode side reaction by-product, may be exhausted from the fuel cell module 10 through an exhaust 66 (See FIG. 1). Electrical energy produced in the fuel cells 12 is transferred in series from the cathode portion 32 of one cell 12 to the anode portion 36 of the next cell 12 via the electrical interconnect material 39.

It is known that fuel reformation causes a temperature decrease in and around the portion of the fuel electrode on which the fuel reformation occurs, Retardation of the rate of reformation of the fuel according to the invention provides for a more even reformation of the fuel along the length of the fuel cell 12, i.e. reformation of fuel is reduced or retarded along an area adjacent to the closed end 22 of the fuel cell 12 where the fuel first comes into contact with the fuel cell 12, since the control layer 50 limits exposure of the fuel to the catalyst material of the fuel electrode. The more even reformation of the fuel along the length of the fuel cell 12 results in the temperature decrease caused by the fuel reformation to be more evenly distributed along the length of the fuel cell 12. Thus, thermal stress, which can result from uneven temperature variation along the length of the fuel cell 12, is reduced. Since the fuel is reformed directly on the anode portion 36 of the fuel cells 12, stack reformer boards, which are employed by some prior art fuel cell generators to reform fuel, are not necessary and can be excluded from the fuel cell generator, thus reducing a cost and a space requirement for the fuel cell module 10.

The control layer 50 applied to a particular fuel cell bundle 11 may vary depending in the particular application for the fuel cell module 10. For example, by changing the arrangement of the control layer 50, i.e., coverage portion of the fuel cell 12, concentration of the control layer 50, number of layers or other factors, the fuel reformation rate along the length of the fuel cell 12 can be controlled to a desired temperature profile so that the performance of the fuel cell module 10 can be optimized.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fuel cell for a fuel cell generator comprising a housing including a gas flow path for receiving a fuel from a fuel source and directing said fuel across said fuel cell, said fuel cell comprising:
   an elongate member including opposing first and second ends and defining an interior cathode portion and an exterior anode portion, said interior cathode portion comprising an electrode in contact with an oxidant flow path and said exterior anode portion comprising an electrode in contact with said fuel in said gas flow path;
   said anode portion comprising a catalyst material for effecting fuel reformation along said fuel cell between said opposing ends; and
   a fuel reformation control layer applied over said catalyst material for reducing a rate of fuel reformation on said fuel cell, said control layer effecting a variable reformation rate along the length of said fuel cell.

2. The fuel cell of claim 1, wherein said control layer comprises a coating material limiting contact of said fuel with said catalyst material, said control layer applied to provide a variable exposure of said catalyst material to said fuel over the length of said fuel cell and comprising a lesser exposure of said catalyst material adjacent to said first end of said elongate member than adjacent to said second end.

3. The fuel cell of claim 2, wherein said control layer defines at least a first area and a second area located longitudinally along the length of said elongate member, said first area defined adjacent to said first end, and said second area defined between said first area and said second end, said first area being covered by said control layer to effect said lesser exposure of said catalyst material adjacent to said first end than adjacent to said second end.

4. The fuel cell of claim 3, wherein said control layer is applied along said first area at a first thickness and said control layer is applied along said second area at a second thickness, said first thickness being greater than said second thickness.

5. The fuel cell of claim 3, wherein said control layer is applied along said first area at a first concentration and said control layer is applied along said second area at a second concentration, said first concentration being greater than said second concentration.

6. The fuel cell of claim 2, wherein said first end of said elongate member comprises a closed end of said fuel cell, and including an oxidant feed tube extending through said elongate member to feed oxidant to said fuel cell adjacent to said first end.

7. The fuel cell of claim 1, wherein said anode portion comprises nickel and at least one of yttria doped zirconia (YSZ) and scandia doped zirconia (ScSZ), and said control layer comprises an oxide of at least one of Cr, Al, Mg, Y, Sc, and Zr.

8. The fuel cell of claim 7, wherein said control layer comprises an oxide of at least Y, Mg, and Zr.

9. The fuel cell of claim 1, wherein between about one-fourth and about one-half of the length said elongate member is covered with said control layer extending from said first end toward said second end and the remainder of said elongate member being substantially without said control layer.

10. A fuel cell bundle for a fuel cell generator module comprising a housing including a gas flow path for receiving a fuel from a fuel source and directing said fuel across said fuel cell bundle, said fuel cell bundle comprising:
    a plurality of elongate members defining fuel cells, each of said elongate members including opposing first and second ends and defining an interior cathode portion and an exterior anode portion, said interior cathode portion comprising an electrode in contact with an oxidant flow path and said exterior anode portion comprising an electrode in contact with said fuel in said gas flow path;
    an interconnection between adjacent fuel cells forming an electrical connection between the cathode portion of one fuel cell and the anode portion of an adjacent fuel cell;
    said anode portion of each fuel cell comprising a catalyst material for effecting fuel reformation along said fuel cell between said opposing ends; and
    a fuel reformation control layer applied over said fuel cells and interconnections forming said fuel cell bundle, said control layer reducing a rate fuel reformation on said fuel cells to effect a variable reformation rate along the length of said fuel cells.

11. The fuel cell bundle of claim 10, wherein said control layer comprises a coating material limiting contact of said fuel with said catalyst material, said control layer applied to provide a variable exposure of said catalyst material to said fuel over the length of said fuel cell bundle and comprising a lesser exposure of said catalyst material adjacent to said first end of said elongate members than adjacent to said second end.

12. The fuel cell bundle of claim 11, wherein said control layer defines at least a first area and a second area located longitudinally along the length of said elongate members, said first area defined adjacent to said first end, and said second area defined between said first area and said second end, said first area being covered by said control layer to effect said lesser exposure of said catalyst material adjacent to said first end than adjacent to said second end.

13. The fuel cell bundle of claim 12, wherein about one-third of the length of said elongate member is covered with said control layer extending along said first area from said first end toward said second end.

14. The fuel cell bundle of claim 10, wherein said anode portion comprises nickel and at least one of yttria doped zirconia (YSZ) and scandia doped zirconia (ScSZ), and said control layer comprises an oxide of at least one of Cr, Al, Mg, Y, Sc, and Zr.

15. The fuel cell bundle of claim 14, wherein said control layer comprises an oxide of at least Y, Mg, and Zr.

16. A method of producing a fuel cell bundle for a fuel cell generator module comprising a housing including a gas flow path for receiving a fuel from a fuel source and directing said fuel across said fuel cell bundle, said method of producing a fuel cell bundle comprising:

providing a plurality of elongate members defining fuel cells, each of said elongate members including opposing first and second ends and defining an interior cathode portion and an exterior anode portion, said interior cathode portion comprising an electrode in contact with an oxidant flow path and said exterior anode portion comprising an electrode in contact with said fuel in said gas flow path;

providing an interconnection between adjacent fuel cells forming an electrical connection between the cathode portion of one fuel cell and the anode portion of an adjacent fuel cell, wherein said anode portion of each fuel cell comprises a catalyst material for effecting fuel reformation along said fuel cell between said opposing ends; and applying a fuel reformation control layer over said fuel cells and interconnections forming said fuel cell bundle, said control layer inhibiting fuel reformation on said fuel cells to effect a variable reformation rate along the length of said fuel cells.

17. The method of claim 16, wherein said step of applying said control layer comprises exposing a first area along the length of said elongate members adjacent to said first end to a liquid solution including a coating material deposited on said anode portion of said fuel cells, said first area comprising less than the full length of said elongate members.

18. The method of claim 17, wherein said step of applying said control layer comprises at least one of wash coating said fuel cell bundle into said liquid solution and brushing said liquid solution onto said fuel cell bundle.

19. The method of claim 17, wherein said anode portion comprises nickel and at least one of yttria doped zirconia and scandia doped zirconia, and said step applying said control layer comprises applying a water based solution comprising at least one of Cr, Al, Mg, Y, Sc, and Zr.

20. The method of claim 17, wherein a length of each of said elongate members between said first area and said second end of elongate members defines a substantial second area of said elongate members, and said step of applying said control layer comprises applying said control layer along said first area at a first thickness and applying said control layer along said second area at a second thickness, said first thickness being greater than said second thickness, and wherein fuel reformation may occur at a higher rate along said second area than along said first area.

\* \* \* \* \*